May 12, 1970   L. WESTERBARKEY   3,511,246
PERFORATED PIPE AND APPARATUS FOR MAKING IT
Filed Aug. 19, 1968
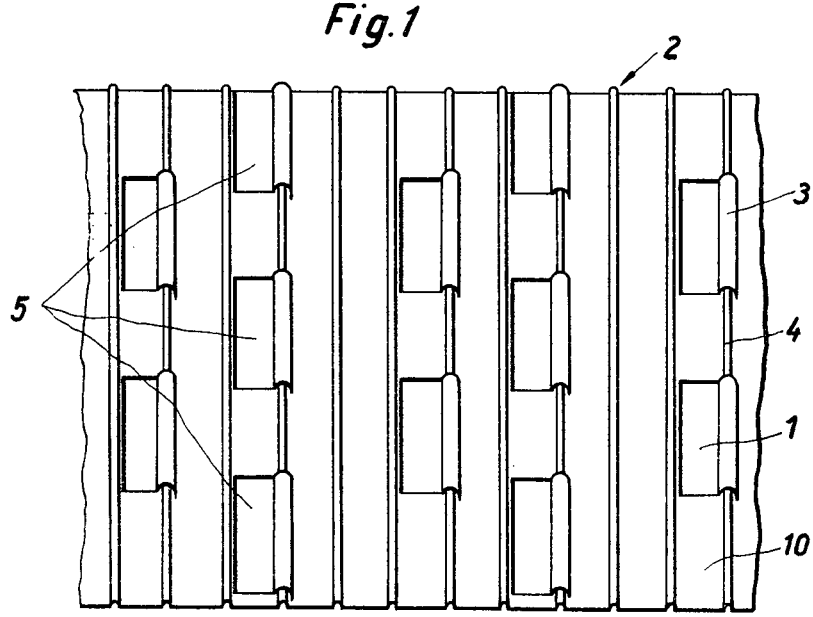
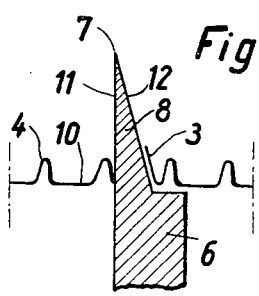
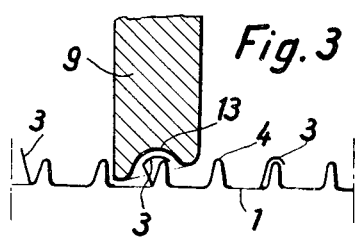
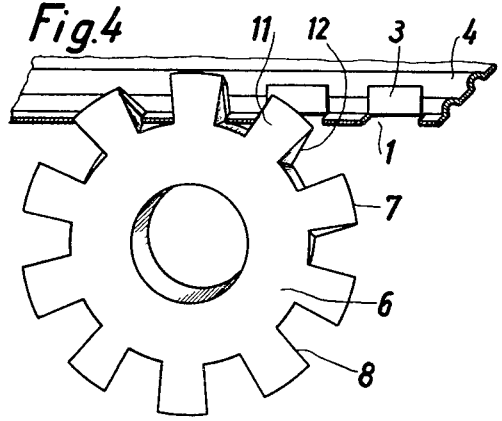
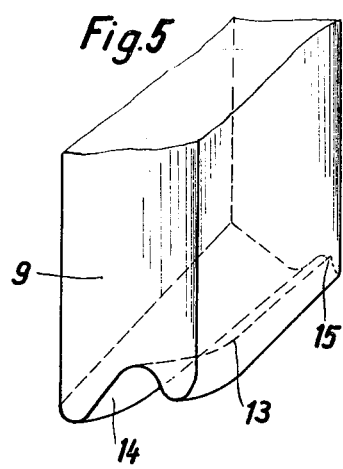
Inventor:
L. Westerbarkey
BY Richards & Geier
ATTORNEYS United States Patent Office 3,511,246
Patented May 12, 1970

3,511,246
PERFORATED PIPE AND APPARATUS FOR MAKING IT
Lorenz Westerbarkey, Gutersloh, Germany, assignor to Firma Westaflexwerk L. & F. Westerbarkey, Gutersloh, Germany, a firm of Germany
Filed Aug. 19, 1968, Ser. No. 760,381
Claims priority, application Germany, Mar. 28, 1968, 1,750,083
Int. Cl. F16l *11/16, 9/16*
U.S. Cl. 138—154    3 Claims

ABSTRACT OF THE DISCLOSURE

A perforated pipe is wound from a ribbed metal strip and is provided with substantially rectangular holes pressed into the pipe from the inside and extending along a longitudinal axis which extends in the direction of the periphery of the pipe. A tongue-shaped burr projecting outwardly from the pipe is folded over adjacent ribs and constitutes a reinforcement.

---

This invention relates to pipes made from thin sheet metal or metal foil and relates more particularly to a perforated pipe wound from a ribbed metal strip.

Pipes to which the invention relate find particular use in heating, ventilating and air-conditioning systems. They are made from one or more ribbed metal strips and are wound in one or more layers on a mandrel. It is known to provide such pipes with holes for the purpose of sound insulation, the holes being punched from the outside by a pronged roller which is placed on the pipe which is rotated and which hobs on the periphery of the pipe as a result of its rotation. Pipes produced in this manner have several drawbacks resulting from this method of making the holes. In order to avoid the pronged roller locking and in order to ensure a satisfactory outflow from the pipe, without deforming the pipe, which preferably consists of soft metal, there is a limitation not only on the number of prongs on the roller, but also with respect to its thickness. Consequently, it is not possible to increase the whole perforated area of the pipe as well as the area of each individual hole to the extent that may be desired in order to provide good sound insulation. Furthermore, the burr of the impressed holes projects through the inner wall of the pipe since the prongs engage in the pipe from the outside. This increases the resistance to flow within such pipes, since, due to the projecting burrs, turbulent zones are formed on the inner walls. Moreover, when these pipes are being assembled, injuries are easily possible due to the sharp burrs. A further disadvantage of the known construction consists in that such pipes cannot be continuously manufactured.

An object of the present invention is to improve prior art constructions by producing a pipe wherein the hole area is enlarged for an improved sound insulation.

Other objects will become apparent in the course of the following specification.

In accomplishing the objects of the present invention, a perforated pipe is provided wound from ribbed metal strip, wherein the longitudinal axis of substantially rectangular holes pressed into the pipe from the inside, lies in the direction of the periphery of the pipe and the tongue-shaped burr projecting outwardly therefrom is folded over adjacent ribs so as to form a reinforcement.

A particular advantage of this construction lies in the fact that the holes run helically in rows in the grooves parallel to the ribs. According to further improvement, alternately two and three ribs are located between the rows of holes and the holes of adjacent rows of holes are mutually staggered with respect to one another.

The present invention also pertains to an apparatus for manufacturing a perforated pipe, comprising a hob having wedge-shaped teeth terminating in cutting edges and means to engage said hob in a rotating pipe from the inside, and wherein folding members are arranged to fold the outwardly pressed tongues closely over adjacent ribs.

The invention will appear more clearly from the following detailed description, reference being made to the accompanying drawing, showing a preferred embodiment of the inventive idea.

In the drawing:

FIG. 1 is a plan view of a section of a pipe according to the present invention;

FIG. 2 is a longitudinal section through the wall of the pipe and a hob engaged in the wall thereof;

FIG. 3 shows the hob while a row of holes is being cut;

FIG. 4 is a longitudinal section through the wall of the pipe and a folding device engaged with said pipe; and FIG. 5 is a perspective view of the folding device.

FIG. 1 shows a pipe 2 into which holes 1 have been cut. The pipe 2 is made from ribbed metal strip and is wound in one or more layers, so that the ribs 4 and the grooves 10 located therebetween pass helically over the periphery of the formed pipe. The holes 1 are arranged continuously in rows 5 in the grooves 10. They are rectangular and the longitudinal axis of the rectangle is parallel to the ribs 4. The width of the holes 1 is somewhat smaller than the distance between the ribs 4. The holes 1 are cut into the pipe 2 from inside, so that a tongue-shaped burr 3 is pressed outwardly, parallel to the ribs 4. The burr 3 which initially projects outwardly as a rectangular tongue from one of the longitudinal sides of a hole 1, is pressed by a folding device over the adjacent rib 4 so that it closely envelops this rib. In this manner, the burr 3 is used for reinforcing the pipe 2. The burrs 3 of the holes 1 of one row of holes 5 are preferably folded over the same rib 4. Preferably, the arrangement of rows of holes 5 is such that alternately two and three ribs 4 are located axially with respect to the pipe 2 between the two rows of holes 5. Consequently, an unbroken groove 10 is located between adjacent rows of holes 5, while two unbroken grooves 10 are arranged between the other separate rows of holes 5. In order to increase the strength of the pipe 2, the holes of adjacent rows are mutually staggered.

FIGS. 2 and 3 illustrate the manner in which the holes 1 are cut into the grooves 10 from the inside of the pipe 2. The teeth 8 of a hob 6 engage into the pipe 2 while it is caused to rotate, moving in the longitudinal direction and projecting out of the winding device, the hob being taken along by the rotation of the pipe 2. The teeth 8 are wedge-shaped and end in cutting edges 7, and are limited by a flank 11 extending vertically to the wall of the pipe and an oblique flank 12 forming an acute angle therewith. The hob 6 is so arranged that the cutting edge 7, closely adjacent a rib 4, presses into the groove 10 and then the tooth 8 engaging more deeply into the wall of the pipe as the hob 6 rotates, bends the tongue-shaped burr 3 outwardly with its oblique flank 12. The distance between the teeth 8 determines the distance between the holes 1, while the width of the tooth determines the length of the holes 1. While a plurality of blades 8, arranged at a single or multiple distance from the grooves 10, engage in the pipe 2, many arrangements of the holes 1 are basically possible. A continuous row of holes 5 is thereby produced by each hob 6.

FIG. 4 shows how the tongue-shaped burr 3 is folded by means of a folding device 9 over one of the ribs 4. The stationary folding device 9 will ensure, subsequent to the cutting of the pipe 2, that the outwardly raised ribs 4, over which the burrs 3 are bent, pass through a groove 13 in the folding device 9. FIG. 5 shows that the groove 13 is widened at the inlet side 14 so that the burrs 3 projecting from the ribs 4 are picked up. The groove 13 tapers so far that at the outlet 15 it has a shape which corresponds to the covering of the ready folded burrs 3. Corresponding to the single or multiple helical rows of holes 5, one or more adjacent folding devices 9 grip on the outside over the ribs 4 which are adjacent the projecting burrs 3. The burrs 3 are pushed into the groove 13 on the inlet side 14 of the folding device 9 and conform in shape to its wall so that when leaving the outlet 15 they closely envelop the ribs located therebeneath.

In order to avoid the wall of the pipe giving way under the pressure of the hob 6 and the folding device 9, the pipe 2 is preferably supported on the outside of said pipe opposite the inwardly engaging hob 6 and on the inside opposite the outwardly engaging folding device 9, by any suitable means, for example, rollers, running along the wall of the pipe.

It is apparent that the example described above has been given solely by way of illustration and not by way of limitation and that it is capable of many variations and modifications within the scope of the present invention.

What is claimed is:

1. A perforated pipe wound from ribbed metal strip, having substantially rectangular holes pressed into the pipe from the inside, wherein the longitudinal axis of said holes lies in the direction of the periphery of the pipe, and a tongue-shaped burr projecting outwardly therefrom, said burr being folded over adjacent ribs so as to form a reinforcement.

2. A pipe as claimed in claim 1, wherein the holes extend helically in rows in grooves parallel to the ribs of the strip.

3. A pipe as claimed in claim 2, wherein alternately two and three ribs are located between the rows of holes and the holes of adjacent rows of holes are mutually staggered.

References Cited

UNITED STATES PATENTS

| | | | |
|---|---|---|---|
| 224,228 | 2/1880 | Ritchie | 138—154 |
| 3,435,852 | 4/1969 | Trihey | 138—154 |

HENRY S. JAUDON, Primary Examiner

U.S. Cl. X.R.

138—156, 177